United States Patent [19]
Tsujimura

[11] Patent Number: 5,877,815
[45] Date of Patent: Mar. 2, 1999

[54] FRAME SYNCHRONIZER APPARATUS FOR SYNCHRONIZING VIDEO AND AUDIO DATA TO A REFERENCE SIGNAL

[75] Inventor: Katsuhito Tsujimura, Kanagawa, Japan

[73] Assignee: Sony Corporation, Tokyo, Japan

[21] Appl. No.: 784,010

[22] Filed: Jan. 15, 1997

[30] Foreign Application Priority Data

Jan. 17, 1996 [JP] Japan .................................. 8-023046

[51] Int. Cl.⁶ ................................................. H04N 9/475
[52] U.S. Cl. .......................................... 348/515; 348/513
[58] Field of Search ................................... 348/512, 513, 348/514, 515, 484, 423, 510; H04N 9/475

[56] References Cited

U.S. PATENT DOCUMENTS

4,851,909  7/1989  Noske .
5,467,139  11/1995  Lankford ................................ 348/512

*Primary Examiner*—Sherrie Hsia
*Attorney, Agent, or Firm*—Frommer Lawrence & Haug, LLP; William S. Frommer; Dennis M. Smid

[57] ABSTRACT

A click noise is prevented from being generated in audio signals when reading of memory jumps. Separated audio data is supplied to a sampling rate converter and converted into an audio signal of a baseband by a D/A converter. This audio signal passes through a low-path filter and is reconverted into a digital audio signal by an A/D converter in accordance with a sampling signal of the rate of the self system. As a result, audio data which is transformed into the rate of another system can be converted into audio data of the rate of the self system.

8 Claims, 5 Drawing Sheets

FRAME SYNCHRONIZER APPARATUS FOR SYNCHRONIZING VIDEO AND AUDIO DATA TO A REFERENCE SIGNAL

BACKGROUND OF THE INVENTION

1. Field of the Invention

The present invention relates to a frame synchronizer designed to synchronize serial digital data in which video data and audio data are multiplexed onto each other to a reference signal of the self system and to output the data.

2. Description of the Related Art

Hitherto, there is a frame synchronizer of the known art which synchronizes audio visual serial digital interface (AV-SDI) data in which audio data and video data from another system are multiplexed onto each other to a reference signal of the self system and which outputs the data.

The operation of such a frame synchronizer will now be described with reference to FIG. 3B. As shown in FIG. 3B, serial input data AV-SDI In, shown in (a) of FIG. 3A, in which audio data and video data from another system are multiplexed onto each other, and a reference signal Ref, shown in (b) of FIG. 3A, of the self system are input to an SDI frame synchronizer (AV frame synchronizer) 100. The frame synchronizer 100 synchronizes the serial input data AV-SDI In to the reference signal Ref as shown at (c) of FIG. 3A and outputs it as serial output data AV-SDI Out.

Figure 3A:
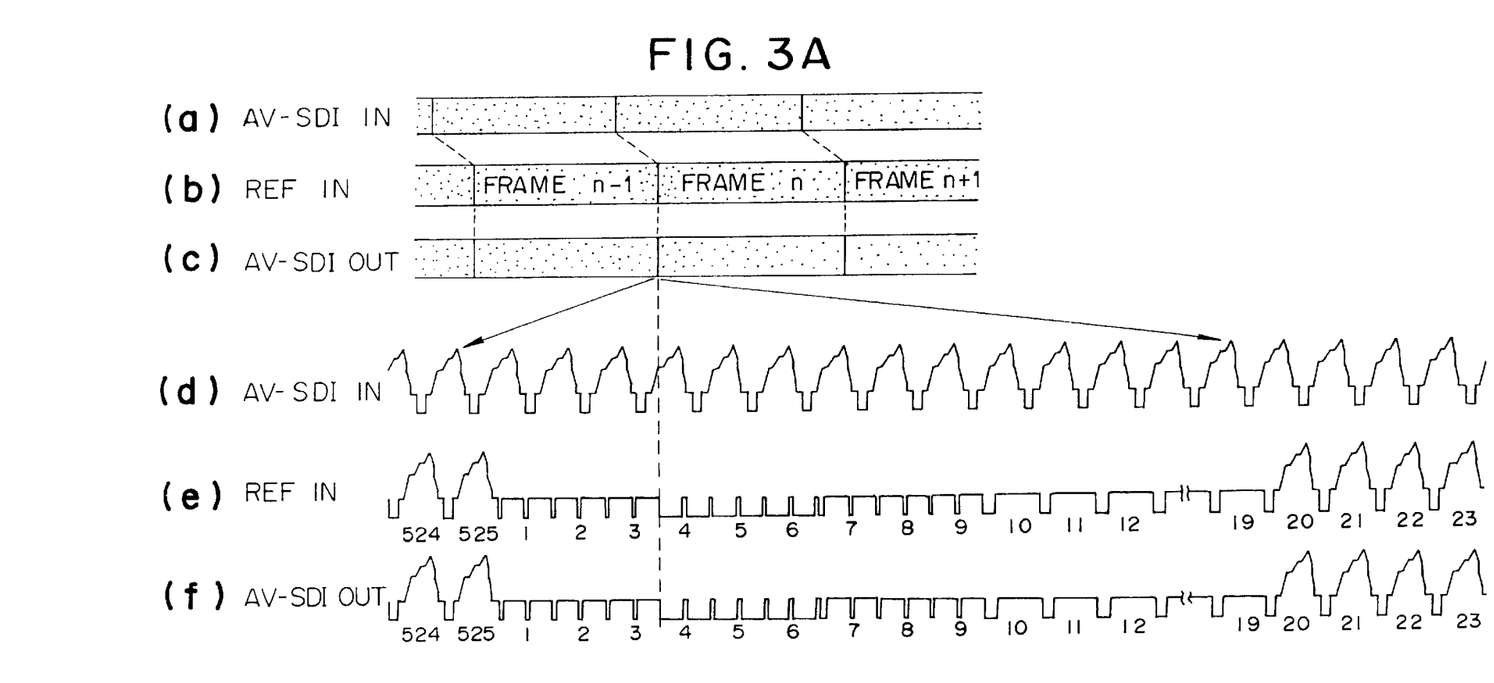
FIGS. 3A and 3B show the frame synchronizer.
Figure 3B:
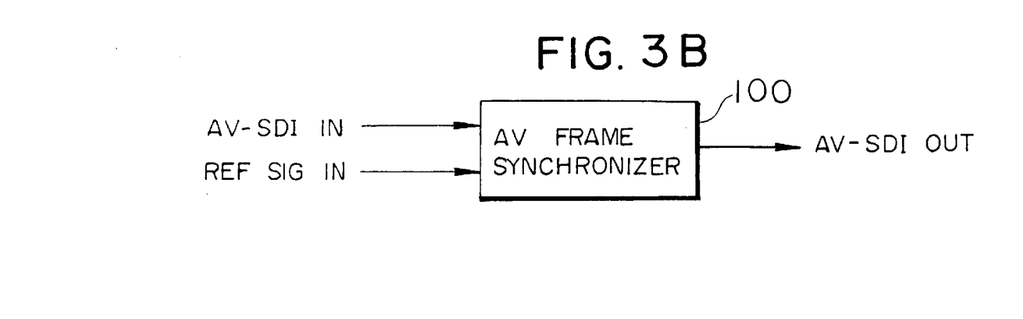

Figures (d) to (f) of FIG. 3A show the states in which parts of the signals shown at (a) to (c) of FIG. 3A are expanded. The serial input data AV-SDI In and the serial output data AV-SDI Out are assumed to be digital data in which audio data and video data are multiplexed onto each other; however, they are shown in an analog form, and the reference signal Ref is assumed to be an analog video signal. It can be seen in these figures that the serial input data AV-SDI In which is out of synchronization is assumed to be the serial output data AV-SDI Out which is in synchronization with the reference signal Ref.

Figure 4:
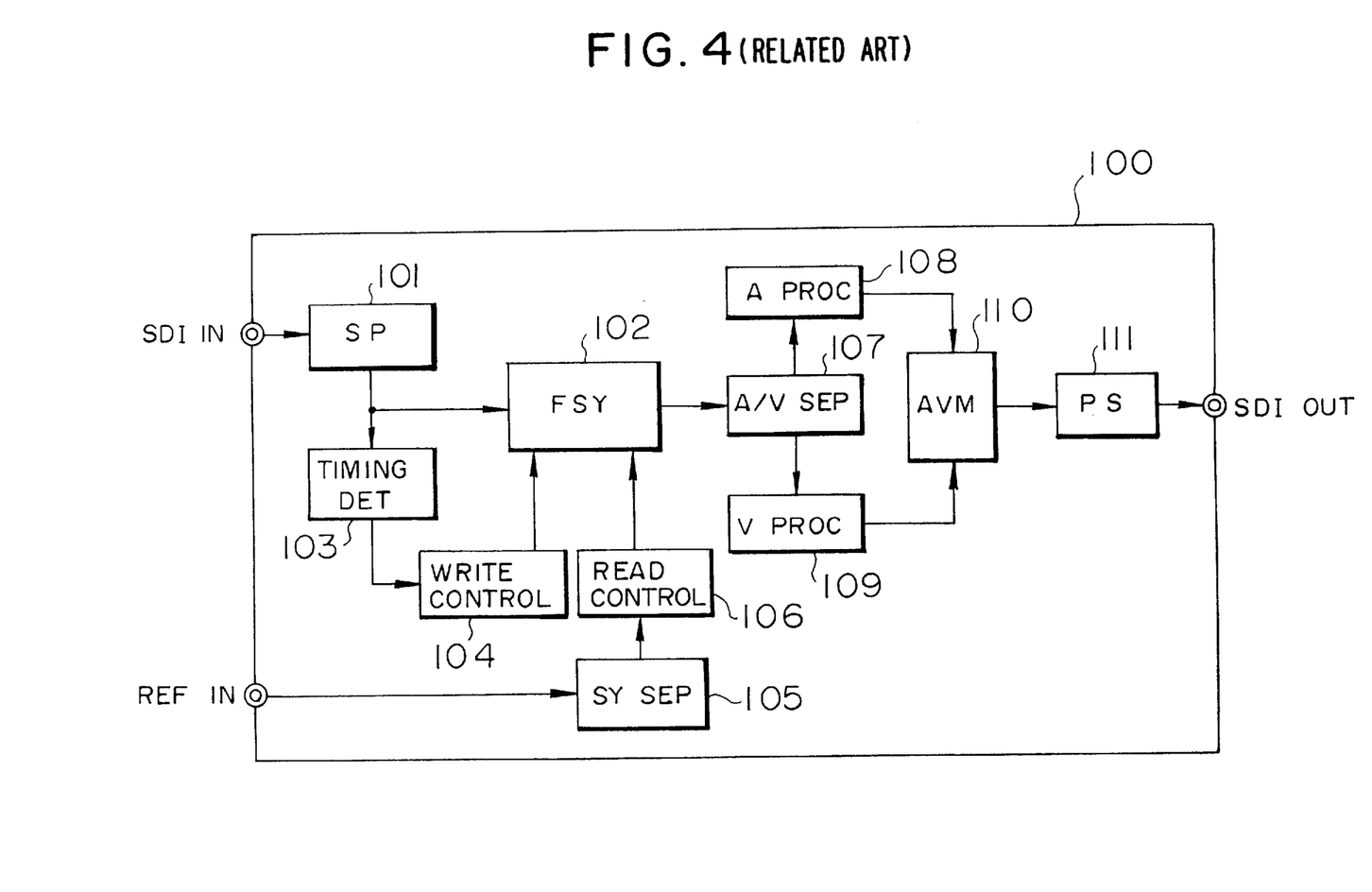
FIG. 4 is a block diagram illustrating the arrangement of a conventional SDI frame synchronizer.

An example of the arrangement of such a frame synchronizer 100 is shown in FIG. 4. In FIG. 4, serial digital data SDI (Serial Digital Interface) in which audio data and video data are multiplexed onto each other is input to the frame synchronizer 100 wherein the data is converted into parallel data by a serial/parallel conversion circuit 101. This parallel data is supplied to a frame memory (FSY) 102 and a timing detection circuit (Timing DET) 103.

The timing detection circuit 103 detects the timing of the digital data which has been converted into parallel data and outputs a timing signal based on the detected timing to a write control circuit (Write Control) 104.

The write control circuit 104 forms a write control signal, such as address data or an enable signal, at the timing of the supplied timing signal and controls the writing in the frame memory 102 in accordance with this write control signal. In this way, the input digital data AV-SDI is written in the frame memory 102 in accordance with its own timing.

Further, the reference signal Ref is input to a synchronization separation circuit (Sy Sep) 105 wherein the signal is separated into a horizontal synchronization signal and a vertical synchronization signal, and the separated synchronization signals are supplied to a read control circuit (Read Control) 106.

The read control circuit 106 forms a read control signal, such as address data or an enable signal, in accordance with the supplied synchronization signal and controls the reading from the frame memory 102 in accordance with the read control signal. More specifically, digital data in which audio data and video data are multiplexed onto each other is read from the frame memory 102 at the timing of the input reference signal Ref, and thus, the digital data is synchronized with the reference signal Ref.

Then, the digital data, in which audio data and video data are multiplexed onto each other, read from the frame memory 102 is separated into video data and audio data by a video/audio separation (A/V Sep) circuit 107. The separated video data is processed by a video processing (V Proc) section 109, and the processes for synchronizing the separated audio data to the video data are performed by an audio processing section (A Proc) 108. The video data and audio data are supplied to an audio/video multiplexer (AVM) 110.

Further, the multiplexed digital data output from the audio/video multiplexer 110 is converted into serial data by a parallel/serial conversion circuit (PS) 111 and output as serial digital data SDI.

As described above, by assuming the writing in the frame memory 102 to be the timing of the input digital data and the reading from the frame memory 102 to be the timing of the reference signal Ref, the SDI frame synchronizer 100 outputs the serial digital data SDI in which audio data and video data are multiplexed onto each other in synchronization with the reference signal Ref.

Figure 5:
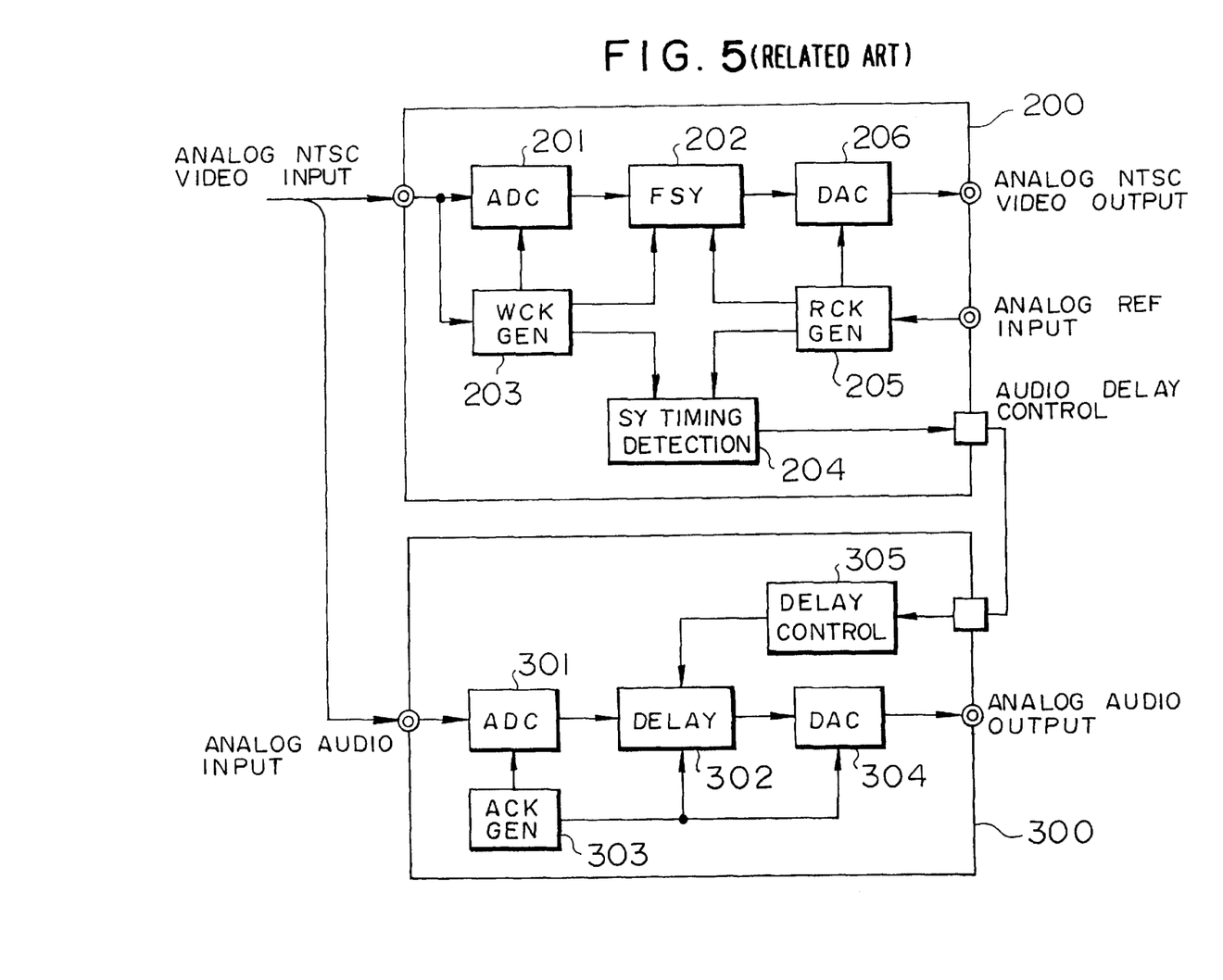
FIG. 5 is a block diagram illustrating the arrangement of a conventional AV frame synchronizer to which an analog NTSC system signal is input.

An example of the arrangement of a conventional AV frame synchronizer of an NTSC (National Television System Committee) system, to which analog audio and video signals are input, is shown in the block diagram of FIG. 5. The AV frame synchronizer comprises a frame synchronizer section 200 and an audio delay line section 300.

In the frame synchronizer section 200 shown in FIG. 5, an input analog NTSC video signal is converted into a digital video signal by an analog/digital converter (ADC) 201 and supplied to a frame memory (FSY) 202. Further, the input analog NTSC video signal is input to a write clock generation circuit (WCk Gen) 203 where a write clock based on the timing of the horizontal synchronization signal and the vertical synchronization signal thereof is generated and supplied to the ADC 201 and the frame memory 202.

Thereupon, the input analog NTSC video signal is converted into a digital signal at the write clock timing by the ADC 201 and written in the frame memory 202 at the write clock timing.

Further, an analog reference signal Analog Ref has been input to the frame synchronizer section 200. This analog reference signal Analog Ref is input to a read clock generation circuit (RCk Gen) 205 where a read clock based on the timing of the input is generated and supplied to the frame memory 202. Thereupon, the digital NTSC video data stored in the frame memory 202 is read out at the read clock timing and supplied to a digital/analog converter (DAC) 206.

The read clock generated from the read clock generation circuit has been supplied to the DAC 206. In the DAC 206, digital data read out from the frame memory 202 is converted into an analog signal at this read clock timing and this converted analog NTSC video signal is output. As a result, the output analog NTSC video signal is synchronized with the analog reference signal Analog Ref.

Further, the timing signal output from the write clock conversion circuit 203 and the timing signal output from the read clock conversion circuit 205 are input to a synchronization timing detection circuit (Sy Timing Detection) 204 where the phase difference between the two timing signals is detected. This phase difference corresponds to the phase difference between the input analog NTSC video signal and the analog reference signal Analog Ref.

On the other hand, the analog audio signal is input to the audio delay line section 300 and is converted into digital audio data by an ADC 301. This digital audio data is input to a digital delay line (Delay) 302 controlled by a delay control circuit (DELAY CTL) 305 whereby it is delayed a predetermined amount, and the digital audio data is converted into analog audio data and output by the DAC 304.

At this point, the phase difference signal detected by the synchronization timing detection circuit 204 is supplied to a digital delay line 302, with the result that because the amount of delay of the digital delay line 302 is controlled, the digital audio data output from the audio delay line section 300 is synchronized with the analog NTSC video signal output from the frame synchronizer section 200.

Further, an audio clock ACk generated by an audio clock generator (ACk Gen) 303 is supplied to the ADC 301, the digital delay line 302 and the DAC 304, which operate at the timing of the audio clock ACk.

According to the AV frame synchronizer shown in FIG. 5, the analog NTSC video signal is output in synchronization with the analog reference signal Analog Ref by the frame synchronizer section 200, and the analog audio signal is output in synchronization with the analog NTSC video signal by the audio delay line section 300.

In the conventional SDI synchronizer, since the frequency of the SDI data input from another system is generally different from that of the reference signal Ref of the self system, there is a case in which a writing signal of the frame memory and a reading signal of the frame memory come close to each other and thus, enter a prohibition area. Since, in such cases, the operation becomes unstable, the reading timing of the frame memory is made to jump one field or one frame ahead so that the writing signal and reading signal of the frame memory do not enter the operation undetermined area.

However, if the reading timing of the frame memory is made to jump one field or one frame ahead, audio data multiplexed on a video tape is also made to jump to one field or one frame ahead.

If so, the continuity of the audio data is disrupted, causing a problem where a click noise is generated in audio signals. The magnitude of this click noise is determined on the basis of the connected state of audio data before and after the noncontinuous point, that is, the phase state. There are cases in which a large noise occurs, and cases in which a noise of a low magnitude such as to not cause disturbance occurs, and cases in which the magnitude of noise is non-uniform.

The frame jump due to the difference in system frequencies occurs at the following interval in the worst case when, for example, the sampling frequency of the NTSC system differs by ±10 Hz:

$$(910 \times 525)/(4 \times 20 \times 3600) \approx 1.66 \text{ [hours]}.$$

When the sampling frequency of the PAL (Phase Alteration by Line) system differs by ±1 Hz, the frame jump occurs at the following interval in the worst case:

$$(1135 \times 625)/(4 \times 2 \times 3600) \approx 24.63 \text{ [hours]}$$

causing a click noise to occur at each time thereof.

SUMMARY OF THE INVENTION

Accordingly, it is an object of the present invention to provide a frame synchronizer in which click noises do not occur in audio signals, even if the reading timing of the frame memory is made to jump one field or one frame ahead.

To achieve the above-described object, according to the present invention, there is provided a frame synchronizer which serially inputs digital data in which audio data and video data are multiplexed onto each other and which synchronizes the digital data to a reference signal and outputs it, the frame synchronizer comprising separation means for separating audio data from the digital data, first conversion means for converting the separated audio data into digital audio data of a baseband, second conversion means for converting the sampling frequency rate of the digital audio data of the baseband output from the first conversion means, a frame memory for storing video data d, wherein the first conversion means converts the audio data into digital audio data of a baseband on the basis of the timing of the input digital data, the second conversion means converts the sampling frequency rate of audio data on the basis of the reference signal, and the video data is written into the frame memory on the basis of the timing of the input digital data and read out from the frame memory on the basis of the timing of the reference signal.

According to another aspect of the present invention, there is provided a frame synchronizer for synchronizing a video signal and an audio signal with a reference signal and outputting them, the frame synchronizer comprising: (a) a first clock generator for generating a first clock signal of 48 kHz on the basis of the timing of the digital audio data; (b) a second clock generator for generating a second clock signal of 48 kHz in accordance with the timing of a reference signal; (c) a sampling frequency conversion circuit for converting the digital audio data into digital audio data of a baseband in accordance with the first clock signal and for converting the sampling frequency of the digital audio data by sampling it in accordance with the second clock signal; (d) a delay circuit, connected to the sampling frequency conversion circuit, for adding a delay to the digital audio data; (e) a delay control circuit, connected to the delay circuit, for generating a delay control signal on the basis of the input timing of the input digital audio data and the input timing of the input reference signal and for controlling the amount of delay; (f) a frame memory for writing the digital video data on the basis of the timing of the input digital data and reading it on the basis of the timing of the reference signal; and (g) a multiplexer for multiplexing an output signal from the frame memory and an output signal from the delay circuit.

According to still another aspect of the present invention, there is provided a frame synchronizer for synchronizing digital audio data and digital video data with each other and outputting them, the frame synchronizer comprising: (a) input means for inputting digital audio and video data which are input serially; (b) separation means, connected to the input means, for separating input digital video data and digital audio data; (c) conversion means, connected to the separation means, for converting the timing of the digital video and the audio data from the timing of input digital data into the timing of reference digital data; (d) multiplex means for multiplexing the digital video and the audio data whose timings have been converted; and (e) output means, connected to the multiplex means, for outputting data serially.

According to a further aspect of the present invention, there is provided a frame synchronizer to which digital data in which audio data and video data are multiplexed is input serially and which synchronizes the digital data with a reference signal and output them, the frame synchronizer comprising: separation means for separating audio data from the digital data; first conversion means for converting the separated audio data into digital audio data of a baseband;

second conversion means for converting the sampling frequency rate of the digital audio data of the baseband output from the first conversion means; and a frame memory for storing video data, wherein the first conversion means converts the audio data into digital audio data of a baseband on the basis of the timing of input digital data, the second conversion means converts the sampling frequency rate of audio data on the basis of the timing of the reference signal, and the video data is written in the frame memory on the basis of the timing of the input digital data and read from the frame memory on the basis of the timing of the reference signal.

According to the present invention, since audio data is converted into baseband signals at the timing of the input digital data and reconverted into audio data at the timing of the reference signal, the rate of the audio data is converted independently in the digital environment. Therefore, even if the reading of the frame memory jumps, it is possible to prevent a click noise from occurring in the audio data due to the jump.

The above and further objects, aspects and novel features of the invention will become more apparent from the following detailed description when read in connection with the accompanying drawings.

DESCRIPTION OF THE PREFERRED EMBODIMENT

Figure 1A:
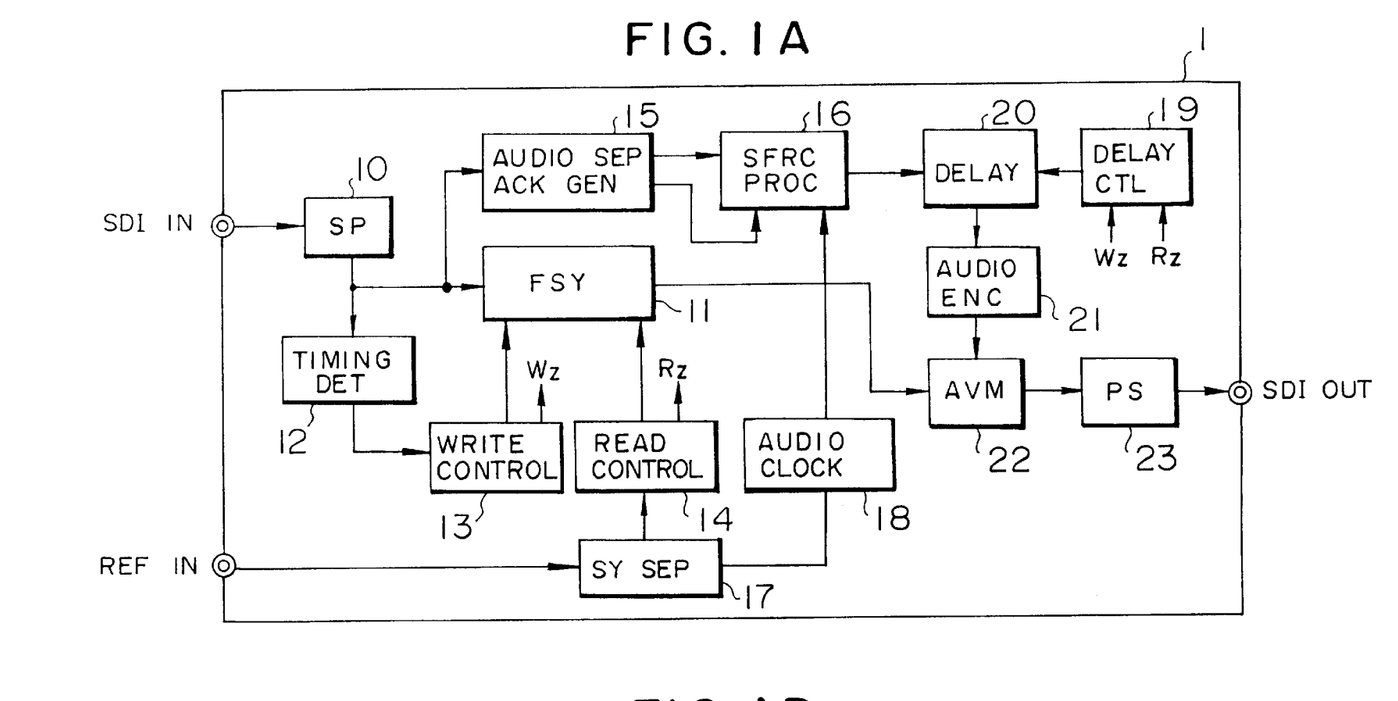
FIG. 1A is a block diagram illustrating the arrangement of an embodiment of a frame synchronizer according to the present invention.

A block diagram illustrating the arrangement of an embodiment of a frame synchronizer of the present invention is shown in FIG. 1A. A principle view of a sampling rate converter built into the frame synchronizer is shown in FIG. 1B.

Figure 1B:
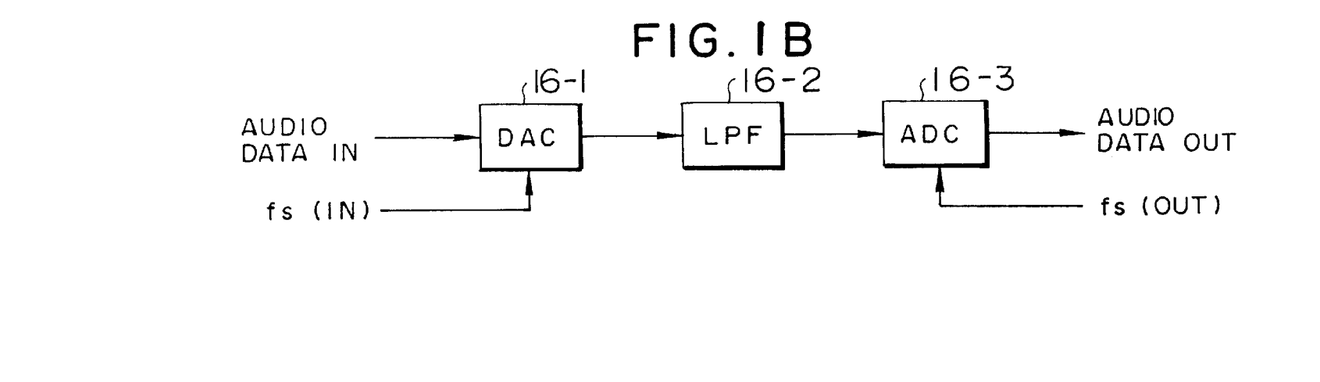
FIG. 1B is a block diagram illustrating the equivalent operating principles of a sampling rate converter which is built into the frame synchronizer.

In FIGS. 1A and 1B, serial digital data SDI (Serial Digital Interface) in which audio data and video data are multiplexed is input to a frame synchronizer 1, and the data is converted into parallel data by a serial/parallel conversion circuit (SP) 10. This parallel data is supplied to a frame memory (FSY) 11 and also input to a timing detection circuit (Timing DET) 12.

The timing detection circuit 12 detects the timing of the digital data which has been converted into parallel data and outputs a timing signal based on the detected timing to a write control circuit (Write Control) 13.

The write control circuit 13 forms address data and a write control signal, such as an enable signal at the timing of the supplied timing signal and controls the writing in the frame memory 11 in accordance with this write control signal. In this way, the input serial digital data SDI is written in the frame memory 11 on the basis of its own timing.

The reference signal Ref is input to a synchronization separation circuit (Sy Sep) 17 wherein the signal is separated into a horizontal synchronization signal and a vertical synchronization signal, and the separated synchronization signals are supplied to a read control circuit (Read Control) 14.

The read control circuit 14 forms address data and a read control signal, such as an enable signal, on the basis of the supplied synchronization signal so that the reading from the frame memory 11 is controlled in accordance with this read control signal. That is, since the stored digital data is read from the frame memory 11 at the timing of the input reference signal Ref, the read digital data is synchronized with the reference signal Ref. The video data read from the frame memory 11 is supplied to an audio/video multiplexer (AVM) 22.

The parallel digital data output from the serial/parallel conversion circuit 10 is input to an audio separation/audio clock generation circuit (Audio Sep ACk Gen) 15, and the audio data separated thereby and the generated audio clock are input to a sampling rate converter processing section (SFRC Proc) 16. Further supplied to the sampling rate converter processing section 16 is an audio clock from an audio clock generation circuit (Audio Clock) 18, which is generated in accordance with the synchronization signal supplied from the synchronization separation circuit 17.

The sampling rate converter processing section 16 returns the audio data to audio data of a baseband by using the audio clock supplied from the audio separation/audio clock generation circuit 15, as will be described later and samples the audio data by using an audio clock at the rate of the reference signal Ref supplied from the audio clock generation circuit 18, so that it is reconverted into audio data in a digital environment. The digital audio data of the baseband means data in which signals, such as flags added for serial transmission, are removed so as to include only audio data.

The audio data output from the sampling rate converter processing section 16 is delayed by a delay circuit 20 so that it is synchronous with the video data and supplied to an audio encoder 21. The delay time of the delay circuit 20 is controlled by a delay control circuit (Delay CTL) 19 on the basis of the time difference between a write timing signal Wz supplied from the write control circuit 13 and a read timing signal Rz supplied from the read control circuit 14. As a result, the video data read from the frame memory 11 becomes synchronous with the audio data output from the delay circuit 20.

Then, the audio data, in which the time axis is compressed, output from the audio encoder 21 is supplied to the audio/video multiplexer (AVM) 22 wherein the video data and audio data are multiplexed.

Further, the multiplexed digital data output from the audio/video multiplexer 22 is converted into serial data by a parallel/serial conversion circuit (PS) 23 and serial digital data SDI is output.

As described above, the frame synchronizer 1 writes the video data at the timing of the input serial digital data SDI into the frame memory 11 and reads video data from the frame memory 11 at the timing of the reference signal Ref, so that the video data is transformed into video data which is synchronous with the reference signal Ref, and the audio data is transformed into audio data at the rate of the reference signal Ref in the sampling rate converter 16. Then, by synchronizing the audio data and video data, the video data and audio data are synchronized with the reference signal Ref. Then, serial digital data in which the video data and audio data are multiplexed is output.

Next, referring to FIG. 1B, the operating principles equivalent to those of the sampling rate converter 16 will be described. The audio data input to the sampling rate converter 16 is converted into a baseband audio signal by a DAC 16-1. As a sampling fs (In) for this case, an audio clock supplied from the audio separation/audio clock generation circuit 15 is used. The unwanted band components of the audio signal which has been transformed to a baseband are removed by a low-path filter (LPF) 16-2 and input to an ADC 16-3. Then, the audio signal is sampled by the ADC 16-3 in accordance with a sampling signal fs (Out) and transformed into audio data with a converted sampling frequency rate. For the sampling signal fs (Out) in this case, an audio clock supplied from the audio clock generation circuit 18 is used.

In this way, audio data in which the sampling frequency rate has been converted is output from the ADC 16-3. Since the sampling signal fs (Out) of the ADC 16-3 is transformed into the rate of the reference signal Ref, the data sequence of the audio data output from the ADC 16-3 becomes the rate of the reference signal Ref. The sampling signals fs (In) and fs (Out) are set at, for example, 48 kHz according to the specifications.

At this point, to avoid misunderstanding, it is necessary to draw attention to the term "conversion of the sampling frequency rate" used in the description of the application of the present invention.

The case in which the term "conversion of the sampling frequency rate" is used is generally a case in which, for example, a first sampling frequency 44 kHz is converted into a second sampling frequency 48 kHz. That is, the term is generally used in cases where a first frequency to be converted and a converted second frequency, 44 and 48 kHz in this case, are considerably different from each other. In the application of the present invention, unlike such a normal understanding, both the first and second sampling frequencies are 48 kHz. Therefore, it seems that this is not a sampling frequency rate conversion at first sight; however, this is also a sampling frequency rate conversion when seen in detail.

The reason for this is as follows. Although both the first sampling frequency fs (In) and the second sampling signal fs (Out) are a nominal frequency of 48 kHz, since the criteria under which they are generated differ, they are not the same frequency in a strict sense. For example, there is a case in which fs (In)=48005 Hz≈48 kHz and fs (Out)=47995 Hz≈48 kHz. This is attributed to the difference in the reference quartz oscillator. This slight difference causes an audio noise to occur once every 1.66 h. Therefore, the "conversion of the sampling frequency rate" referred to in the present invention means this slight frequency conversion.

According to the frame synchronizer 1 described above, even if the writing and reading timings of the frame memory 11 enter the prohibition area and jumping is made to a video signal one frame or one field ahead, it is possible to prevent a click noise from occurring in audio signals since the audio system is converted into the rate of the reference signal Ref independently by the sampling rate converter 16 which is a process that is separate from the video system.

Figure 2:
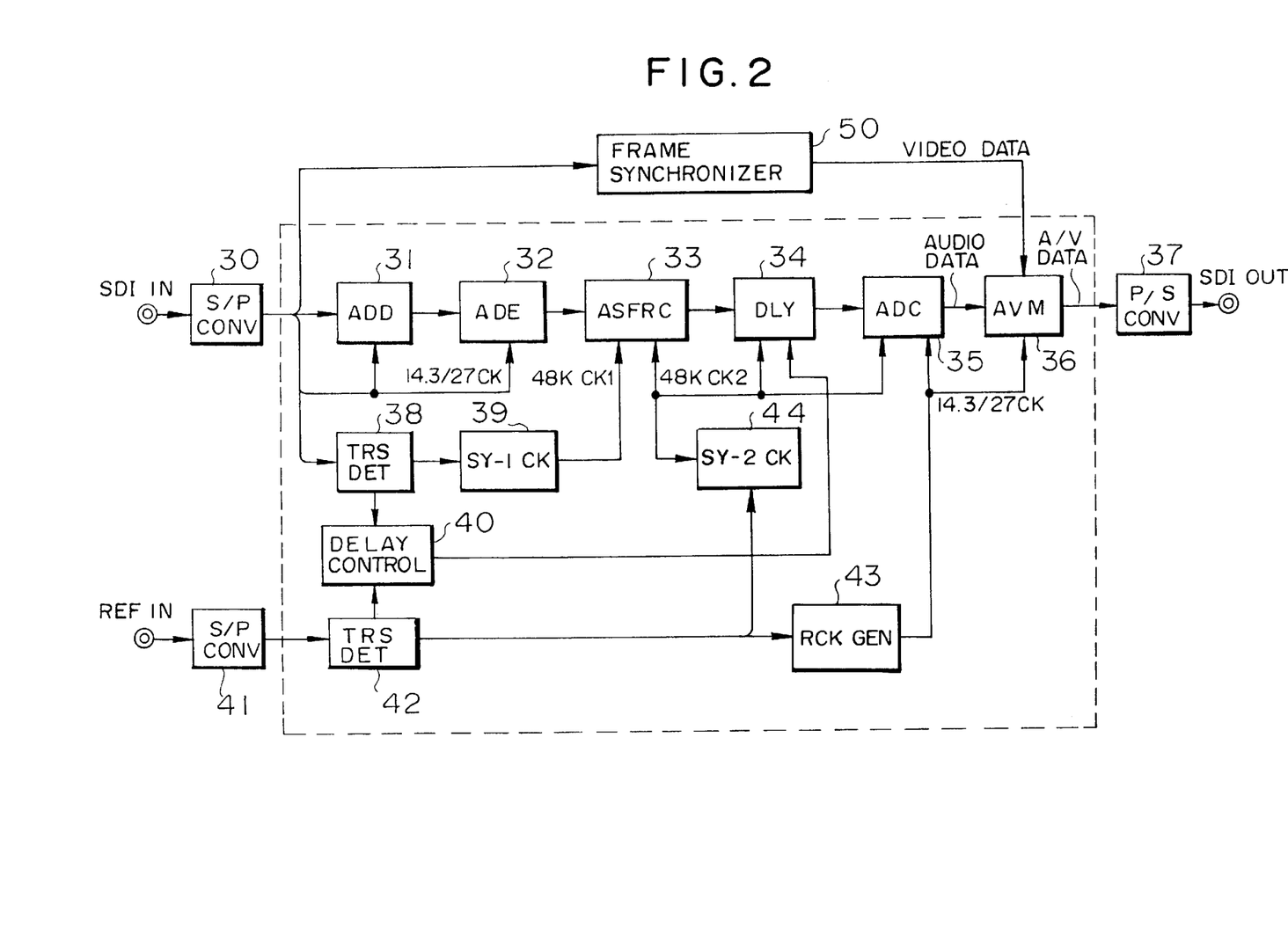
FIG. 2 is a block diagram illustrating in detail the arrangement of the audio system of the frame synchronizer according to the present invention.

Next, a detailed arrangement for converting the rate of the audio system into the rate of the reference signal Ref is shown in FIG. 2.

In FIG. 2, the serial digital data SDI in which the input audio data and video data are multiplexed is converted into parallel data by a serial/parallel conversion circuit (S/P Conv) 30. The parallel digital data output from the serial/parallel conversion circuit 30 is subjected to the above-described video system process by a frame synchronizer 50.

Further, the digital data output from the serial/parallel conversion circuit 30 is input to an audio multiplexer (ADD) 31 where audio data is separated and supplied to an audio expansion circuit (ADE) 32. The audio data expanded on the time axis by the audio expansion circuit 32 is input to a sampling rate converter processing section 33.

The audio timing of the input serial digital data SDI is detected by a timing detection circuit (TRS DET) 38, and the timing signal is fed to a system-1 clock generation circuit 39. As a result, the audio clock of the system-1 at which the serial digital data SDI input from the system-1 clock generation circuit 39 is output is reproduced and supplied to the sampling rate converter processing section 33.

The reference signal Ref is converted into parallel data by a serial/parallel conversion circuit 41 and supplied to a timing detection circuit (TRS DET) 42. The timing of the reference signal Ref is detected by the timing detection circuit 42 and supplied to a system-2 clock generation circuit 44. As a result, an audio clock of system-2, which is the self system, is generated from the system-2 clock generation circuit 44 and supplied to the sampling rate converter processing section (ASFRC) 33.

In the sampling rate converter processing section 33, a digital process is performed based on an operating principle such as that shown in FIG. 1B. By performing a sampling timing conversion process in the digital environment as described above, audio data which is transformed into the audio clock rate of system-2 is output.

The time difference between the timing detected by the timing determination circuit 38 and the timing detected by the timing detection circuit 42 is calculated by a delay control circuit 40, and a delay control signal corresponding to the time difference is supplied from the delay control circuit 40 to a delay circuit (DLY) 34. Audio data which is transformed into the audio clock rate of system-2 has been supplied to the delay circuit 34, and audio data which is synchronized with the output video data is output from the delay circuit 34.

This audio data is compressed on the time axis by an audio data compression circuit (ADC) 35 and supplied to an audio/visual multiplexer (AVM) 36.

Video data which has been processed so as to be synchronized with the reference signal Ref in the frame synchronizer 50 has been supplied to the audio/visual multiplexer (AVM) 36, and this video data and audio data are multiplexed with the time axes thereof being synchronized.

Further, the multiplexed A/V data output from the audio/visual multiplexer 36 is converted into serial data by a parallel/serial conversion circuit (PS) 37, and serial digital data SDI is output.

A clock generated by a clock generator (RCk-GEN) 43 in accordance with the timing signal of the reference signal Ref detected by the timing detection circuit 42 has been supplied to the audio data compression circuit 35 and the audio/visual multiplexer 36. The frequency of this clock is set to be 27 MHz when the ratio of the sampling frequency of the luminance information Y to the color difference information Cr and Cb is 4:2:2, and is set to be 14.3 MHz in the case of a 4fsc NTSC system. The frequency of the audio clock generated from the system-1 clock generation circuit 39 and the system-2 clock generation circuit 44 is set to be approximately 48 kHz. However, the present invention is not limited to this frequency.

The present invention is arranged as described above. Therefore, since audio data is converted into a baseband signal at the rate of input digital data and reconverted into audio data having the frequency rate of the reference signal in the digital environment, even when the reading of the frame memory jumps, it is possible to prevent a click noise from being generated in the audio signals due to jumping.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the claims. The following claims are to be accorded the broadest interpretation so as to encompass all such modifications and equivalent structures and functions.

What is claimed is:

1. A frame synchronizer for synchronizing a video signal and an audio signal with a reference signal and for outputting a synchronized signal, said frame synchronizer comprising:

input means for inputting digital data containing video data and audio data which is input serially;

separation means, connected to said input means, for separating said audio data from said digital data;

sampling frequency rate conversion means for generating digital audio data of a baseband on the basis of the timing of said input digital data from said separated audio data and sampling this digital audio data of the baseband in accordance with a sampling signal formed from said reference signal;

frame memory means for writing said video data on the basis of the timing of said input digital data and reading the written video data on the basis of the timing of said reference signal; and a multiplexer for multiplexing the digital audio data output from said sampling frequency rate conversion means and the digital video data output from said frame memory means.

2. A frame synchronizer according to claim 1, further comprising: delay means, connected between said sampling frequency rate conversion means and said multiplexer, for delaying by a predetermined time digital audio data output from said sampling frequency rate conversion means.

3. A frame synchronizer according to claim 2, wherein said delay means includes a delay circuit and delay circuit control means.

4. A frame synchronizer according to claim 3, wherein said frame memory means comprises a writing control circuit for generating a writing control clock in accordance with a signal generated on the basis of the timing of said input digital data, a reading control circuit for generating a reading control clock in accordance with a signal generated on the basis of the timing of the reference signal, and a frame memory from which the digital video data is written and read by these writing and reading control circuits.

5. A frame synchronizer according to claim 4, wherein said delay circuit control means determines the amount of delay in accordance with signals input from said writing and reading control circuits.

6. A frame synchronizer for synchronizing a video signal and an audio signal with a reference signal and for outputting a synchronized signal, said frame synchronizer comprising:

a first clock generator for generating a first clock signal of 48 kHz on the basis of the timing of digital audio data;

a second clock generator for generating a second clock signal of 48 kHz in accordance with the timing of the reference signal;

a sampling frequency conversion circuit for converting said digital audio data into digital audio data of a baseband in accordance with said first clock signal and for converting the sampling frequency of said digital audio data by sampling said digital audio data in accordance with said second clock signal;

a delay circuit, connected to the sampling frequency conversion circuit, for adding a delay to said digital audio data;

a delay control circuit, connected to said delay circuit, for generating a delay control signal on the basis of the input timing of input digital audio data and the input timing of said reference signal and for controlling the amount of delay;

a frame memory for writing digital video data on the basis of the timing of input digital data and reading the written digital video data on the basis of the timing of said reference signal; and a multiplexer for multiplexing an output signal from said frame memory and an output signal from said delay circuit.

7. A frame synchronizer for synchronizing digital audio data and digital video data with each other and for outputting a synchronized signal, said frame synchronizer comprising:

input means for inputting digital audio and video data which are input serially;

separation means, connected to said input means, for separating input digital video data and digital audio data;

conversion means, connected to said separation means, for converting the timing of said digital video and said audio data from the timing of input digital data into the timing of reference digital data;

multiplex means for multiplexing said digital video and said audio data whose timings have been converted; and output means, connected to said multiplexed means, for outputting data serially.

8. A frame synchronizer to which digital data in which audio data and video data are multiplexed is input serially and which synchronizes the digital data with a reference signal and to output a synchronized signal, said frame synchronizer comprising:

separation means for separating the audio data from said digital data;

first conversion means for converting the sampling frequency rate of said digital audio data of the baseband output from the first conversion means; and a frame memory for storing video data, wherein said first conversion means converts said audio data into digital audio data in a baseband on the basis of the timing of input digital data, said second conversion means converts the sampling frequency rate of audio data on the basis of the timing of said reference signal, and said video data is written in said frame memory on the basis of the timing of said input digital data and read from said frame memory on the basis of the timing of said reference signal.

* * * * *